A. J. MOISANT.
APPARATUS FOR AND PROCESS OF PREPARING OZONE COMPOUNDS.
APPLICATION FILED JUNE 3, 1916.
1,406,058.
Patented Feb. 7, 1922.
2 SHEETS—SHEET 1.
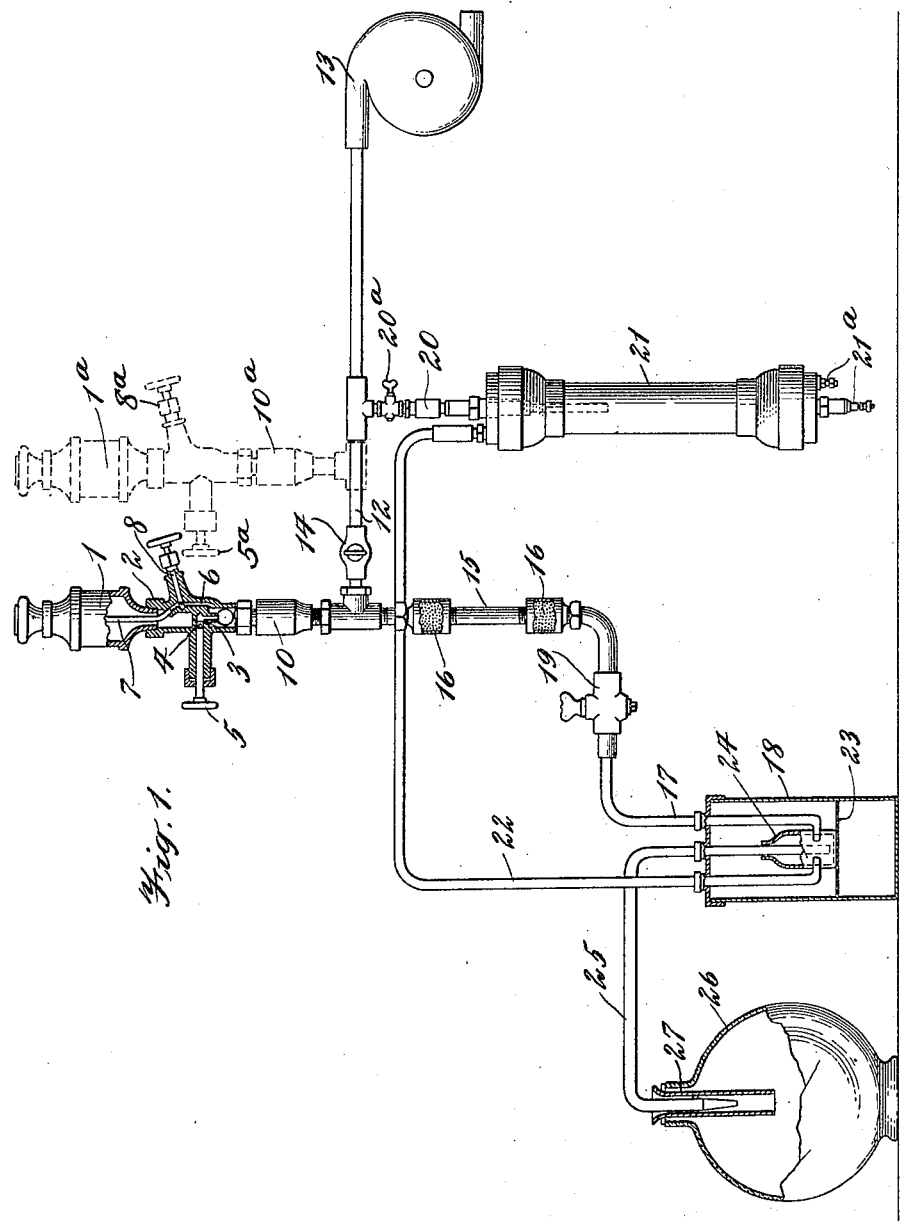

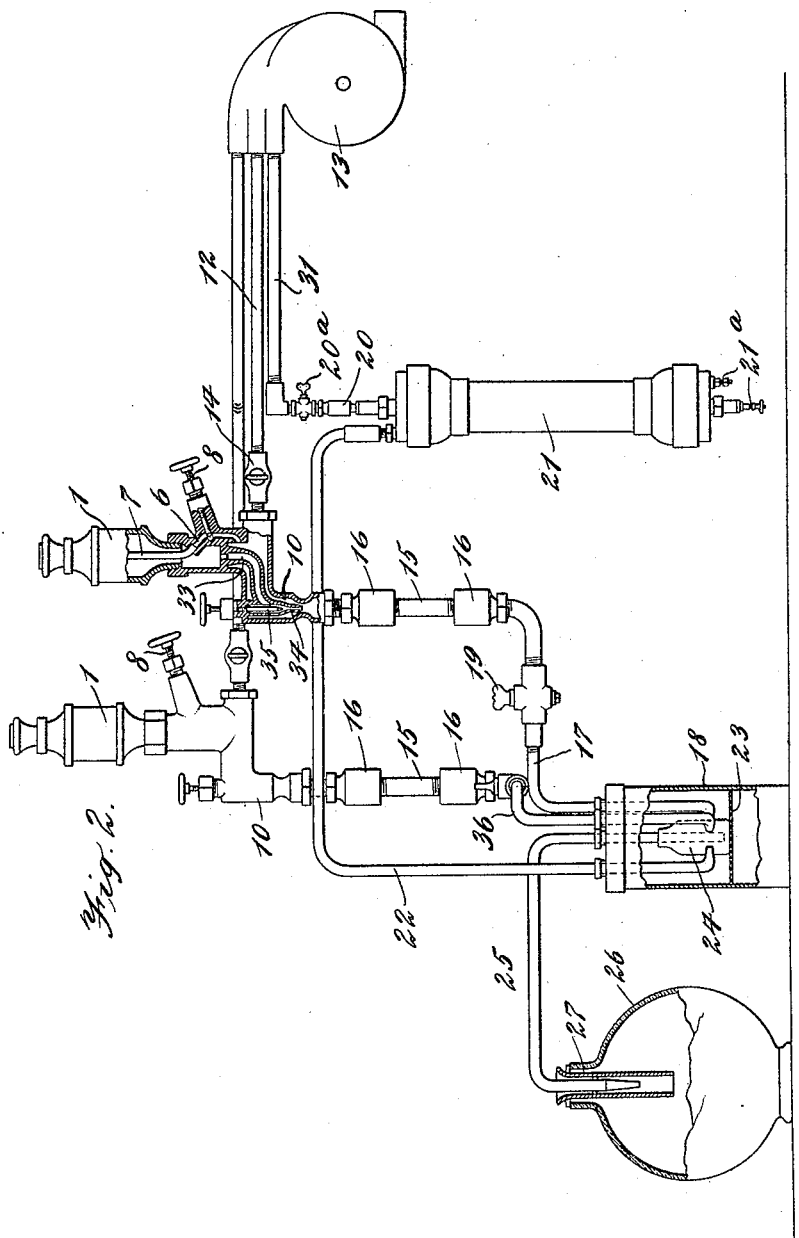

UNITED STATES PATENT OFFICE.

ALFRED J. MOISANT, OF NEW YORK, N. Y., ASSIGNOR, BY MESNE ASSIGNMENTS, TO GENERAL RESEARCH LABORATORIES, A CORPORATION OF NEW YORK.

APPARATUS FOR AND PROCESS OF PREPARING OZONE COMPOUNDS.

1,406,058.   Specification of Letters Patent.   Patented Feb. 7, 1922.

Application filed June 3, 1916. Serial No. 101,483.

*To all whom it may concern:*

Be it known that I, ALFRED J. MOISANT, a citizen of the United States, residing at the city of New York, in the borough of Manhattan and State of New York, have invented certain new and useful Improvements in Apparatus for and Processes of Preparing Ozone Compounds, of which the following is a full, clear, and exact description.

This invention relates to an apparatus for and a process of ozonizing substances such as essential oils, alcohols, and the like, which have a curative or stimulating effect upon the human system.

One of the objects of the invention is to provide an ozonized compound or an ozonid in such a form that it may be distributed into the atmosphere which is to be breathed by the person to be cured, and to continuously produce a compound of this character, the strength and quality of which may be maintained uniform for any desired period of time.

Another object of the invention is to provide an apparatus and process by means of which ozonized compounds or ozonids of different substances may be intimately mixed and distributed into the atmosphere in any required strengths and proportions.

My invention therefore contemplates a process and apparatus in which proper quantities of the one or more substances to be ozonized are mixed with a body of air or other gaseous body, which is thereafter ozonized, preferably by commingling the mixture thus obtained with ozonized air. Where two or more substances are to be ozonized and mixed before being distributed into the atmosphere, the invention contemplates a process and apparatus whereby these substances may be either first mixed with air or other gaseous body and thereafterwards united to form a common mixture, which is treated with the ozone, or one in which each of the substances to be ozonized is first mixed with air and then led to a common chamber where the mixtures are simultaneously treated with ozone, preferably in the form of ozonized air.

The invention also contemplates an apparatus by means of which the quantity of the substances which is mixed with the body of air or other gaseous matter may be regulated at will by the operator of the apparatus, which will permit of the production of an ozonized compound or ozonid containing any desired proportion of the substance. Furthermore, the invention contemplates an apparatus which accurately controls the quantity of the ozone which acts upon the mixture by providing a proper control for the supply of air which is ozonized and also by properly regulating the strength of the electric current which varies the strength of the ozonized air produced. The invention also contemplates the provision of adequate means for controlling the quantity or amount of the gaseous mixture containing the substance to be ozonized, which is mingled or brought into direct union with the ozonized air.

Other advantages and features of the invention will be apparent from the detailed disclosure hereinafter to follow, in which the production of pinene ozonid will be described and thereafter the production of an ozonized compound consisting of pinene ozonid and an ozonized compound of alcohol, but it is intended that such disclosure will be regarded as illustrative of the invention and not as limiting it to the production of the particular compounds referred to.

In the accompanying drawings,

Figure 1 shows somewhat diagrammatically an embodiment of an apparatus for carrying out the invention; and Figure 2 shows a modified form of apparatus.

The pinene or other substance to be ozonized is contained within a closed cup or reservoir 1, in which it is protected from the atmosphere. This cup is preferably of glass or other suitable material, and is mounted upon a valve casing 2.

The liquid within the cup or container passes downwardly through an opening in its bottom into a duct or conduit 3 which leads to the interior of the valve casing, the flow of liquid through this duct being controlled by a needle valve 4 which may be regulated in the usual manner by a handle 5. The air within the valve casing 2 is under pressure, as will be later described, and a bypass 6 and pipe 7 which lead to a point above the level of the liquid in the cup 1 admits sufficient air above the liquid to balance the pressure permitting the liquid to flow out of the conduit 3. The bypass 7 is controlled by a valve 8. The valve casing 2 is mounted upon a pipe or tube 10 which constitutes the upper part of the charging chamber. Air is supplied to the pipe 10 by a tube or pipe 12, into which air is introduced under pressure by means of the pump 13, the passage of the air through the pipe 12 being controlled by a valve 14. The tubes 10 and 12 are both connected to a pipe 15, through which the air from the pipe 12 passes. The pinene or other substance to be ozonized is fed to the charging chamber 10 in drops, which are discharged from the conduit 3. Suitable means are interposed in the pipe 15 to cause the complete dissociation of these drops and also to cause them to form an intimate mixture with the air flowing through the pipe 15. This means may consist of chambers 16 filled with a loose mass of material through the interstices of which the air passes; the material may be beads or other similar objects or may consist of gauze diaphragms.

The mixture of the air and the substance to be ozonized then passes through a pipe 17 into a sealed mixing chamber 18. Interposed within the pipe 17 is a regulating or control valve 19, by means of which the quantity of the mixture admitted to the mixing chamber may be accurately regulated.

The ozone used is preferably in the form of ozonized air. The air utilized may be taken from the tube or pipe 12, as shown, and carried through the pipe 20 to an ozone tube 21 to which electric current is supplied by wires (not shown) which would be connected to the terminals $21^a$. Any suitable tube may be utilized, and as is well known in the art the strength of current supplied will determine the strength of ozone produced. The ozonized air is led from the ozonizing tube 21 to the sealed mixing chamber 18 by means of a tube or pipe 22.

Mounted on a perforated diaphragm or false bottom 23 within the mixing chamber is a jar or bottle 24 into the neck of which is inserted a tube 25 which fits loosely therein so as to provide a small annular passage or space between the neck of the bottle and the tube. This tube 25 leads to a diluting chamber 26. The tube 25 may be surrounded at its point of entrance into the globe-shaped chamber 26 by an injector 27 which will force a quantity of atmospheric air into the diluting chamber.

The manner in which the apparatus described is used is as follows: A supply of atmospheric air is passed through the pipe 12 by means of the pump 13 which air fills the charging chamber and also passes downwardly through the pipe 17 into the mixing chamber 18. Electric current is then passed through the ozone tube 21 which may be, as for example, 6,000 volts, although a different voltage may be used, depending upon the quantity and strength of the ozonized air required. Air from the pipe 12 is then admitted into the ozone tube by opening the control valve $20^a$, and the ozonized air will pass out from the tube into the mixing chamber by means of a pipe 22. The valves for controlling the flow of the substance to be ozonized are then adjusted, the valve 8 being regulated to balance the pressure upon the top of the substance within the container to permit the liquid to be fed from the conduit 3 in the form of drops, and the valve 8 adjusted to regulate the size and rapidity of the drops. The rate at which the substance to be ozonized is fed varies in accordance with the substance used, as for example, with liquid pinene from 2 to 10 drops per minute, have been found sufficient to produce the requisite amount of pinene ozonid. The drops of liquid pinene which fall into the charging chamber immediately begin to dissociate, due to the high vapor tension of liquid pinene, and form a homogeneous mixture with the air. However, if any large particles of the substance remain, they will be broken up by passing through the chambers 16. The homogeneous mixture in the tube 17 is then admitted to the mixing chamber in the proper amounts by regulating the valve 19. The commingling of the ozonized air and the mixture produces within the mixing chamber 18 pinene ozonid in the form of a dense white smoke. Since the ozonized air and the air charged with pinene are both led to the mixing chamber under pressure, the pinene ozonid within the mixing chamber 18 will also be under pressure and will force itself into the container or bottle 24 through the passage afforded by the space between the tube 25 and the neck of this bottle, thereby insuring a thorough mixture of the pinene ozonide and air. The pinene ozonid then passes out of the mixing chamber through the tube 25 into the diluting chamber 26 where it is mixed with a large volume of air forced into the diluting chamber by means of the injector 27. The diluted pinene ozonid escapes into the surrounding atmosphere through the mouth of the diluting chamber. The apparatus is under absolute control during the entire process, since the valve 3 may be adjusted to regulate the quantity of the substance to be ozonized which is supplied, and the valve 19 to regulate the supply of the mixture of air and the substance to be ozonized. Furthermore, the volume of ozonized air which is used may be controlled by the valve $20^a$ and its strength by varying the strength of current passing through the ozone tube 21.

It is therefore obvious that the character of the ozonid produced may be varied at will or may be maintained of a standard quality or grade irrespective of variations in the temperature of the place in which the generator or apparatus is installed. It is also clear that the liquid pinene or other substance in the closed reservoir or container is protected from the atmosphere and its quality cannot be affected by evaporation of part of its volatile contents which makes it possible to utilize a reservoir of sufficient size to hold a supply of liquid pinene or other volatile substance which will permit the continuous operation of the apparatus for an extended period of time.

In a modified form of apparatus, several devices for feeding different substances or liquids to charge the current of air passing through the pipe 12 may be utilized. As for example, a second charging chamber 10ª and reservoir 1ª which is controlled by valves 5ª and 8ª similar in construction to the valves 5 and 8, may be utilized and this reservoir or container may be filled with alcohol or other suitable solvent or cleanser. As for example, such container when filled with alcohol may be utilized preliminarily to cleanse the tubes of the system for it is a well known fact that liquid pinene is an extremely sticky substance and if not entirely dissociated, will soon clog a system or tubes through which it passes. Therefore, by first passing air charged with alcohol through the tubes 15 and 17, these parts may be thoroughly cleansed before the production of pinene ozonid is commenced.

Moreover, it may be desirable, in some instances, to charge the air with two or more liquids, as for example, to charge the air with liquid pinene and alcohol simultaneously. This may be accomplished by the use of the modified form of apparatus described, and the valves which control the flow of the respective fluids regulated so that these liquids are fed to the stream of air in the proper proportions. If desired, more than two of the feeders may be placed upon the pipe 12 as is obvious.

In Figure 2 a modified form of generator or apparatus is shown which is used when it is desired to obtain a mixture of a plurality of different ozone compounds in a form to be distributed into the atmosphere. The general characteristics of the generator is similar to the one shown in Figure 1 of the drawing. The ozonized air is supplied to the mixing chamber 18 by a pipe 22 which connects with the ozone tube 21 as before described. However, this ozone tube is connected directly to the pump 13 by a separate pipe 31, the supply of air being controlled by the valve 20ª. The substance to be ozonized is as before enclosed within a cup or container 1, the pressure upon the liquid within the container being balanced by the pipe 7, bypass 6 and valve 8 as before described. The air which is to be mixed with the substance to be ozonized is also, as in the previous construction, supplied from the pump 13 through the pipe 12, which pipe 12 communicates with a charging chamber 10 leading to a pipe 15 which in turn is connected to the pipe 17 leading to the mixing chamber 18. Instead, however, of feeding the liquid substance to be ozonized to the charging chamber in the form of drops in the previous construction, a form of sprayer is utilized which consists of a conduit 33 in communication with the cup or container 1 which conduit leads to a spray nozzle 34 which is controlled by a manually adjustable needle valve 35. The charging chamber is of reduced diameter at a point surrounding the opening in the spray nozzle 34 so that the air which enters through the pipe 12 under pressure, when passing through the reduced portion of the tube will have a greater velocity and hence will suck the liquid from the spray nozzle 34 in the form of a fine spray, the amount of liquid thus ejected into the charging chamber 10 being controlled by the needle valve 35.

In the form shown in this view, instead of mounting the different containers 1 upon the same pipe 12 and thus obtaining a common mixture of the different substances with the same body of air, each of the containers 1 which holds one of the substances to be ozonized, is separately connected to the pump 13 and leads by a separate pipe 36 to the common mixing chamber 18, the several bodies of the charged air then being commingled within the mixing chamber 18 with the ozonized air to produce a mixture of the different ozonids or ozonid compounds in a form to be distributed into the atmosphere.

In using the form of apparatus shown in Figure 2, one of the containers may be filled with pinene and the other with alcohol as previously described or different substances may be used, the process employed and the results obtained being practically the same as with the type of generator shown in Figure 1.

I claim:

1. The process of producing a mixture of a plurality of different ozone compounds in a form to be distributed into the atmosphere which consists in injecting each of the different substances into an individual body of fluid, by means of small successive charges, and then commingling the different charged bodies of fluid with a common body of ozonized air.

2. The process of producing a mixture of a plurality of different ozone compounds in a form to be distributed into the atmosphere which consists in injecting each of the different substances into an individual column of air by means of small successive charges, and then commingling the different charged air columns with a common body of ozonized air.

3. In an apparatus for preparing ozonids, a mixing chamber, a fluid conduit leading to said mixing chamber, means for supplying fluid under pressure to said conduit, means for supplying ozonized air to said mixing chamber, and a device for successively feeding small quantities of the substance to be ozonized to the fluid in the fluid conduit.

4. In an apparatus for preparing ozonids, a mixing chamber, a fluid conduit leading to said mixing chamber, means for supplying fluid under pressure to said conduit, a charging chamber in open communication with said mixing chamber, a device for successively feeding small quantities of the substance to be ozonized to the charging chamber, and means for supplying ozonized air under pressure to said mixing chamber.

5. In an apparatus for preparing ozonids, a mixing chamber, an air conduit leading to said mixing chamber, means for supplying air under pressure to said conduit, a charging chamber in open communication with said air conduit, means for successively feeding small quantities of the substance to be ozonized to the air supply conduit, means for supplying ozone to the mixing chamber, and means for respectively regulating the quantity of the substance admitted to the charging chamber and the quantity of ozonized air which is admitted to said mixing chamber.

6. In an apparatus for preparing ozonids, an air conduit, means for supplying air under pressure to said conduit, a charging chamber in open communication with said air conduit, a mixing chamber, a conduit connecting said charging chamber to said mixing chamber, a control valve in said last named conduit, a device for successively feeding small quantities of the substance to be ozonized to the charging chamber, means for regulating such supply, means for supplying ozonized air to said mixing chamber, and means for regulating the supply of ozonized air admitted to the mixing chamber.

7. In an apparatus for preparing ozonids, an air conduit, a mixing chamber in communication with said air conduit, means for feeding the substance to be ozonized to the air in said conduit, means for supplying ozone to the mixing chamber, a diluting chamber in communication with said mixing chamber, and means for introducing atmospheric air into said diluting chamber.

8. In an apparatus for preparing ozonids, a fluid conduit, a mixing chamber in communication with said conduit, means for feeding the substance to be ozonized to the fluid in said conduit, means for supplying ozone to the mixing chamber, a diluting chamber in communication with said mixing chamber, and an injector for supplying air to said diluting chamber.

In witness whereof, I subscribe my signature, in the presence of two witnesses.

ALFRED J. MOISANT.

Witnesses:
WALDO M. CHAPIN,
MARY G. HART.